United States Patent
Kurian (10) Patent No.: US 10,419,539 B2
(45) Date of Patent: Sep. 17, 2019

(54) DATA TRANSFER PATH SELECTION

(71) Applicant: Bank of America Corporation, Charlotte, NC (US)

(72) Inventor: Manu J. Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 98 days.

(21) Appl. No.: 15/599,724

(22) Filed: May 19, 2017

(65) Prior Publication Data
US 2018/0337992 A1 Nov. 22, 2018

(51) Int. Cl.
| | | |
|---|---|---|
| H04L 29/08 | (2006.01) | |
| G06F 13/14 | (2006.01) | |
| G06F 16/22 | (2019.01) | |
| H04L 29/06 | (2006.01) | |
| G06F 15/76 | (2006.01) | |
| G06F 15/173 | (2006.01) | |

(52) U.S. Cl.
CPC .......... *H04L 67/1097* (2013.01); *G06F 13/14* (2013.01); *G06F 15/76* (2013.01); *G06F 16/22* (2019.01); *H04L 67/327* (2013.01); *H04L 69/14* (2013.01); *G05B 2219/15052* (2013.01); *G06F 15/17368* (2013.01); *H04L 67/1095* (2013.01)

(58) Field of Classification Search
None
See application file for complete search history.

(56) References Cited

U.S. PATENT DOCUMENTS

| | | |
|---|---|---|
| 7,606,187 B2 | 10/2009 | Zeng et al. |
| 8,285,681 B2 | 10/2012 | Prahlad et al. |
| 8,527,549 B2 | 9/2013 | Cidon |
| 8,619,779 B2 | 12/2013 | Li et al. |
| 8,762,642 B2 | 6/2014 | Bates et al. |
| 8,788,628 B1 | 7/2014 | Taylor et al. |
| 8,805,951 B1 | 8/2014 | Faibish et al. |
| 8,805,968 B2 | 8/2014 | Taylor et al. |
| 8,832,820 B2 | 9/2014 | Barjatiya et al. |
| 8,850,130 B1 | 9/2014 | Aron et al. |
| 8,958,417 B2 | 2/2015 | Zhao et al. |
| 9,147,195 B2 | 9/2015 | Sivaramakrishnan et al. |
| 9,256,374 B1 | 2/2016 | Aron et al. |
| 9,313,281 B1 | 4/2016 | Lietz et al. |
| 9,398,087 B1 | 7/2016 | Hosie et al. |
| 9,424,437 B1 | 8/2016 | Ancin et al. |

(Continued)

*Primary Examiner* — Mohammad S Adhami
(74) *Attorney, Agent, or Firm* — Michael A. Springs (57) ABSTRACT

In an embodiment, a system contains a network testing engine that sends test data along different paths of a network between a source and a destination, wherein each path contains a plurality of network nodes, and receives, in response to sending the test data, response data about the paths. The system further contains a network path characteristics engine that determines characteristics of each path based on the response data, and a delivery parameters engine that receives a request for delivery of a data load from the source to the destination and determines, based on the request, delivery parameters. Furthermore, the system contains the source and a path selection engine that determines a selected path of the different paths based on the characteristics of the paths and the delivery parameters, and sends the selected data path to the source, which sends the data load along the selected path to the destination.

19 Claims, 4 Drawing Sheets

(56) References Cited

U.S. PATENT DOCUMENTS

| | | |
|---|---|---|
| 9,454,398 B2 | 9/2016 | Hacker |
| 9,565,200 B2 | 2/2017 | Bacastow et al. |
| 2008/0168510 A1* | 7/2008 | Small ............... H04N 21/47202 725/100 |
| 2014/0250471 A1* | 9/2014 | Guerra ............. H04N 21/43615 725/82 |
| 2017/0039218 A1 | 2/2017 | Prahlad et al. |
| 2018/0331955 A1* | 11/2018 | Ju ........................ H04L 41/065 |

* cited by examiner

DATA TRANSFER PATH SELECTION

TECHNICAL FIELD

The present disclosure relates generally to data transfer across networks.

BACKGROUND

In typical systems, when data loads travel across a network of nodes from a source to a destination, the path the data loads take from the source to the destination is static, or, in some cases, unknown. Such systems do not account well for dynamic speed decreases, security problems, or other issues in portions of the network that the data loads must traverse to reach its destination. Sending data loads, in particular relatively large data loads, is often hindered by these issues in typical systems.

SUMMARY OF EXAMPLE EMBODIMENTS

In an embodiment of the present disclosure, a system contains a network testing engine configured to send test data along different paths of a network between a source and a destination, wherein each of the different paths contains multiple nodes of the network, and to receive, in response to sending the test data, response data comprising information about the different paths. The system also contains a network path characteristics engine configured to determine characteristics of each of the different paths based on the response data. The system further contains a delivery parameters engine configured to receive a request for delivery of a data load, the request containing information about the data load, a data load source, and a data load destination, wherein the data load source is the same as the source, and the data load destination is the same as the destination, and to determine, based on the request, one or more delivery parameters that describe at least one of requirements or preferences for the delivery of the data load. In addition, the system contains a path selection engine configured to determine a selected path, wherein the selected path is one of the different paths, based on the characteristics of each of the different paths and the one or more delivery parameters, and to send the selected data path to the data load source. The system also contains the data load source, which is configured to send the data load along the selected path to the data load destination.

In another example embodiment of the present disclosure, a method includes sending test data along different paths of a network between a source and a destination, wherein each of the different paths comprises multiple of nodes of the network. The method also includes receiving, in response to sending the test data, response data comprising information about the different paths, and determining characteristics of each of the different paths based on the response data. Furthermore, the method includes receiving a request for delivery of a data load, the request comprising information about the data load, a data load source, and a data load destination, wherein the data load source is the same as the source, and the data load destination is the same as the destination. In addition, the method includes determining, based on the request, one or more delivery parameters that describe at least one of requirements or preferences for the delivery of the data load, as well as determining a selected path, wherein the selected path is one of the different paths, based on: the characteristics of each of the different paths and the one or more delivery parameters. The method also includes sending the data load along the selected path to the data load destination.

In accordance with the present disclosure, disadvantages and problems associated with the transmission of data load across networks or portions of networks may be reduced or eliminated in some embodiments of the present disclosure. For example, certain embodiments create a more dynamic way (through use of a method or a system) to select a path that a particular data load will take through a network. For example, specific data loads may have paths through networks chosen or vetted for them to increase the speed at which the data load is transmitted, decrease the total amount of time needed to transmit the particular data load, or increase the security of the path taken by the data load from a certain source to a certain destination. As one example, certain embodiments of the present disclosure may identify nodes or hops between nodes in a network that are security risks, inconsistently transmit data, lose connectivity at certain rates or times, etc. By using this information, certain embodiments can select alternative paths through a network to deliver data loads. In addition, some embodiments of the present disclosure identify and determine parameters of the delivery of certain data loads, and these embodiments can accommodate such parameters by selecting appropriate paths through a network. Thus, custom, or semi-custom paths can be selected dynamically for new requests to transmit data loads in certain embodiments. In addition, some embodiments allow for the creation of a "map" of different paths that is updated, and by using historical information gathered about various network paths, trends can be determined to allow for predictions identifying suitable paths for data transmission, for example at certain times of day, on certain days of the week, through certain nodes of a network, etc. Thus, embodiments of the present disclosure provide technological solutions to technological problems, e.g., by creating better ways to transfer data across networks to increase transfer speed, reliability, data security, etc., in a dynamic way that can respond to changes in network behavior and/or the specifics or requirements of particular data loads. In certain embodiments, some benefits of the present disclosure are realized to a greater degree as the size of particular data loads increase, such that relatively larger data loads may experience pronounced benefits compared to relatively smaller data loads in some embodiments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE EXAMPLE DRAWINGS

For a more complete understanding of the present disclosure and for further features and advantages thereof, reference is now made to the following description taken in conjunction with the accompanying example drawings, in which.

DETAILED DESCRIPTION

In typical systems, when data loads travel across a network of nodes from a source to a destination, the path the data loads take from the source to the destination is static, or, in certain cases, unknown. Such systems do not account well for dynamic speed decreases, security problems, or other issues in portions of the network that the data loads must traverse to reach its destination. Sending data loads, particularly relatively large data loads, is often hindered by these issues in typical systems.

Certain embodiments of the present disclosure allow for the dynamic selection of preferred or optimal paths through a network for a particular data load. For instance, some embodiments map different paths through the network by sending out test data through different network paths, and then receiving response data from the destination or network nodes. By processing the response data (as well as information about the test data), path characteristics can be created that describe characteristics of each path mapped. Then, when a data load must be transferred through the network, these path characteristics can be used, in conjunction with delivery parameters (e.g., requirements or delivery preferences) for the data load, to select an appropriate path.

For example, by sending test data to map a network (e.g., over several instances spanning a period of time), an example system determines path characteristics that show that path X generally delivers data more quickly than path Y, except for between 3:00 pm and 5:00 pm Eastern Time on weekdays. During that timeframe, path Y is faster than path X. Then, when a time-sensitive request to send a data load across the network is scheduled for (or requested at) 3:45 pm on a Tuesday, the example system will select path Y for the data load.

Such example embodiments dynamically create maps of a network by capturing path characteristics for multiple paths. In some example embodiments, the map (the collection of path characteristics) is created or updated over time before the request for sending a particular data load is received. When the data load transfer request is received, these previously created path characteristics can be used to select a path through the network. In other embodiments, the network paths are dynamically mapped upon receipt of a request to transfer a particular data load in order to determine a suitable (or optimal) path available at that moment. In still other embodiments, combinations of such approaches are used. This disclosure contemplates these and other embodiments described herein, including embodiments as understood by persons having skill in the art based on this disclosure.

In accordance with the present disclosure, disadvantages and problems associated with the transmission of data load across networks or portions of networks may be reduced or eliminated in some embodiments. For example, certain embodiments create a more dynamic way (through use of a method or a system) to select a path that a particular data load will take through a network. For example, specific data loads may have paths through networks chosen or vetted for them to increase the speed at which the data load is transmitted, decrease the total amount of time needed to transmit the particular data load, or increase the security of the path taken by the data load from a certain source to a certain destination. As one example, certain embodiments of the present disclosure may identify nodes or hops between nodes in a network that are security risks, inconsistently transmit data, lose connectivity at certain rates, etc. By using this information, certain embodiments can select alternative paths through a network to deliver data loads. In addition, some embodiments of the present disclosure identify and determine parameters of the delivery of certain data loads, and these embodiments can accommodate such parameters by selecting appropriate paths through a network. Thus, custom, or semi-custom paths can be selected dynamically for new requests to transmit data loads. In addition, some embodiments allow for the creation of a "map" of different paths that is updated, and by using historical information gathered about various network paths, trends can be determined to allow for predictions identifying suitable paths for data transmission, for example at certain times of day, on certain days of the week, through certain nodes of a network, etc. Embodiments of the present disclosure therefore provide technological solutions to technological problems, e.g., by creating better ways to transfer data across networks to increase transfer speed, reliability, data security, etc., in a dynamic way that can respond to changes in network behavior and/or the specifics or requirements of particular data loads. In certain embodiments, relatively larger data loads may experience pronounced benefits compared to relatively smaller data loads in some embodiments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Figure 1:
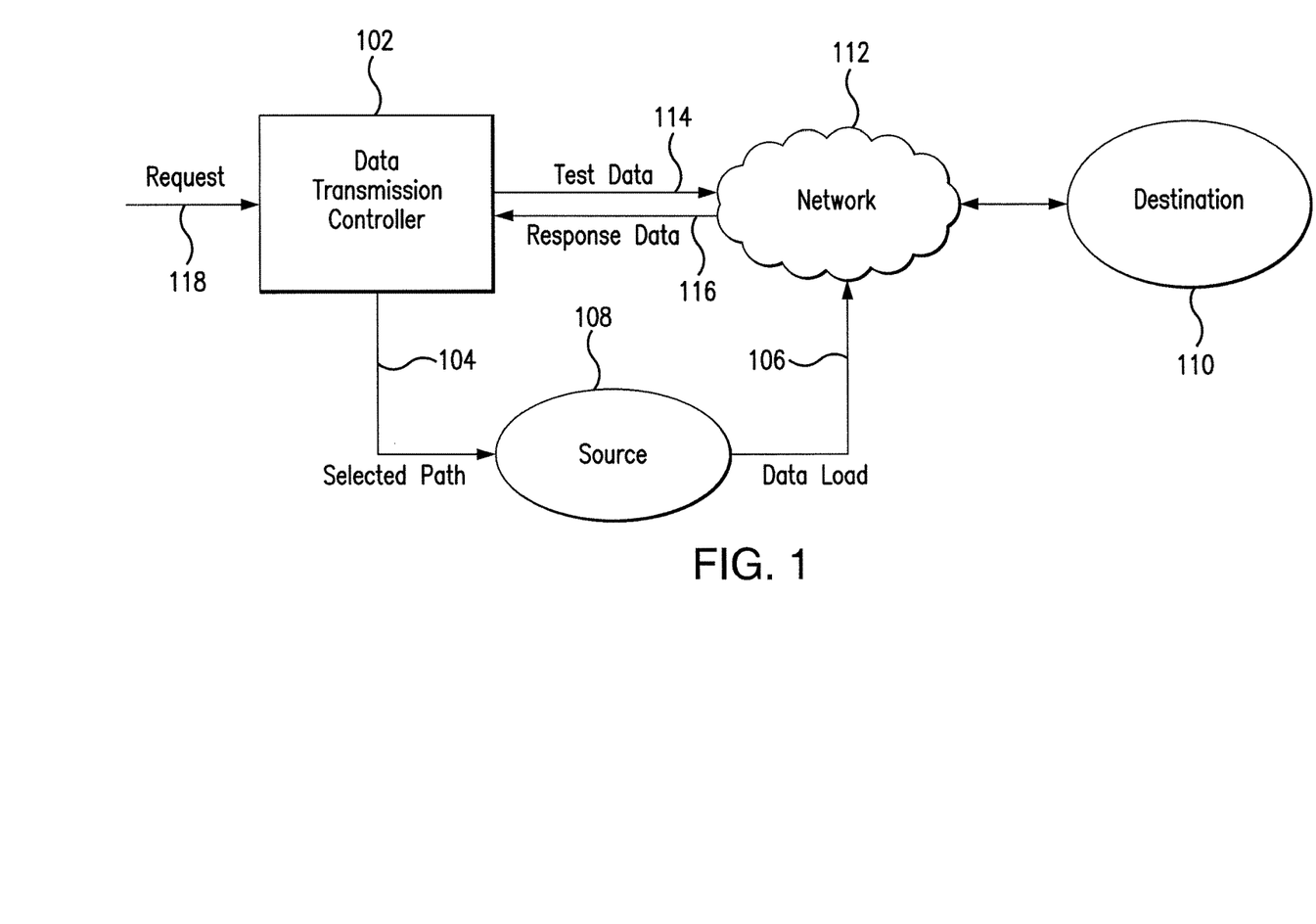
FIG. 1 illustrates an overview of a data path selection system, according to an example embodiment of the present disclosure.
Figure 2:
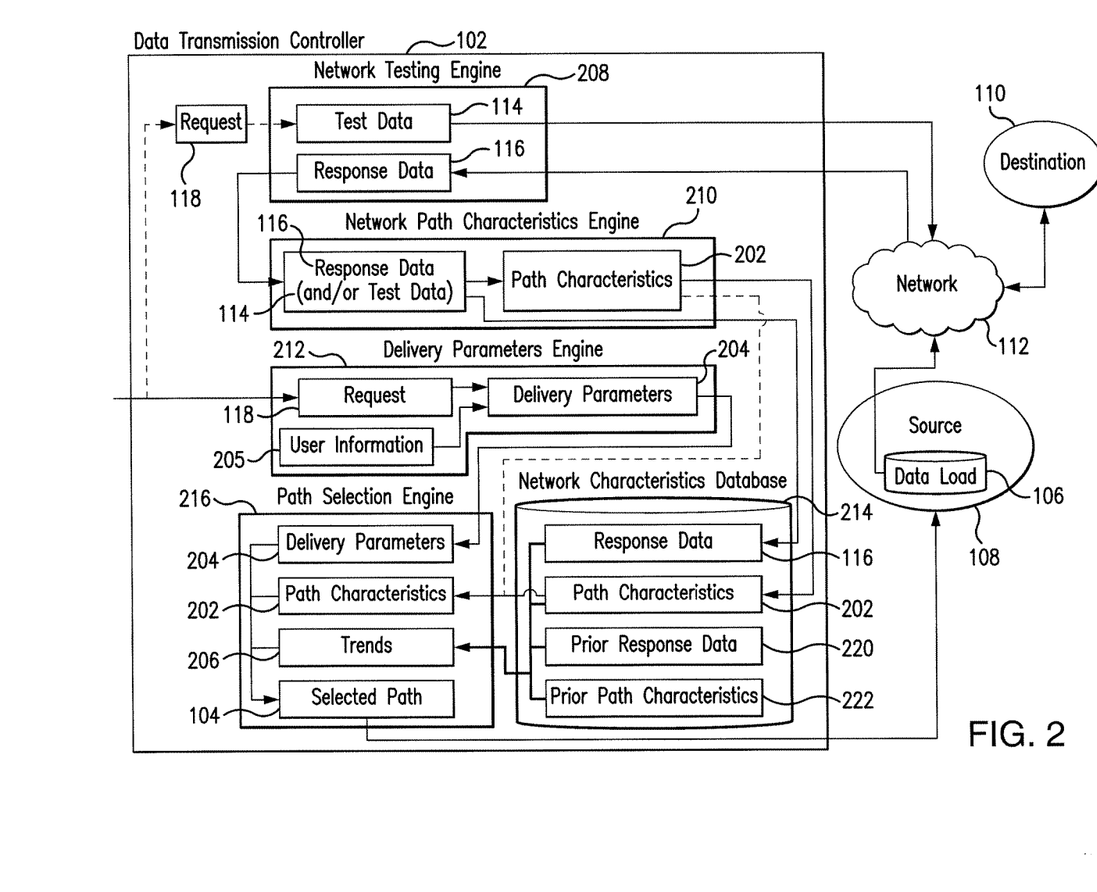
FIG. 2 illustrates a more detailed view of an example data transmission controller within the context of the data path selection system of FIG. 1, according to an example embodiment of the present disclosure.
Figure 3:
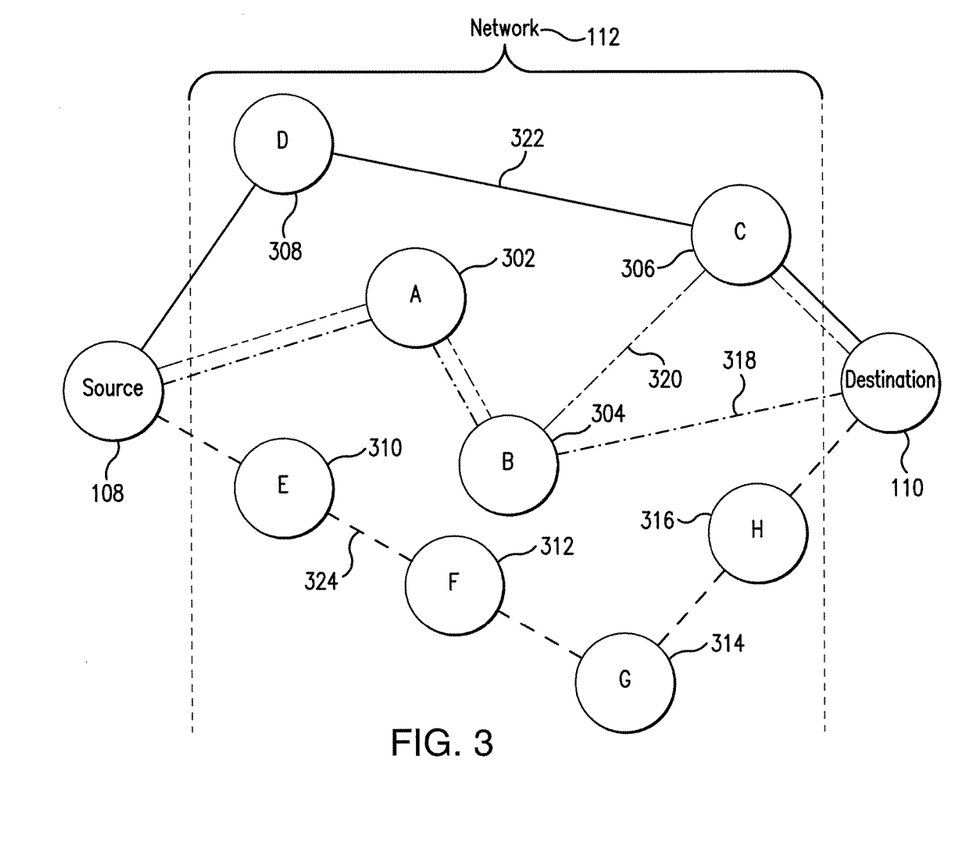
FIG. 3 illustrates example paths through a network between the source and destination of FIGS. 1 and 2, according to an example embodiment of the present disclosure.
Figure 4:
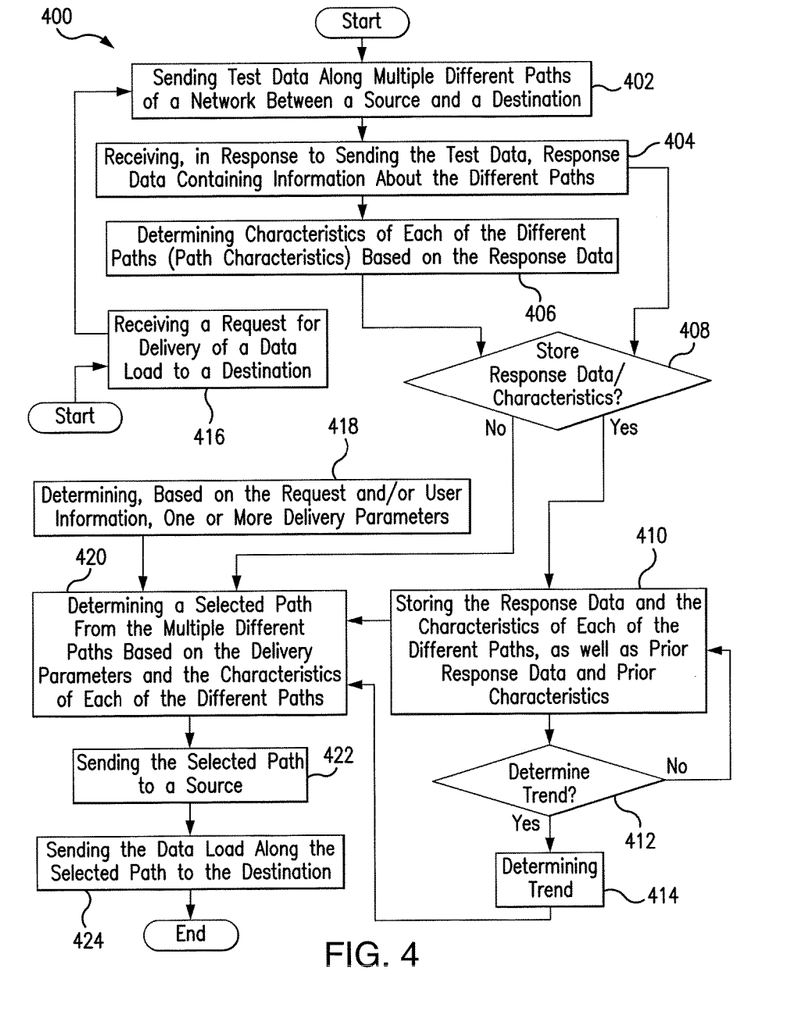
FIG. 4 illustrates a method for dynamically determining a selected path through a network for delivering a data load, according to an example embodiment of the present disclosure.

FIG. 1 provides an overview of an example path selection system, including a data transmission controller, and FIG. 2 provides more detail regarding example components of the data transmission controller shown in FIG. 1. FIG. 3 illustrates example nodes and paths through an example network, and FIG. 4 shows an example method for selecting a path through a network, according to an example embodiment.

FIG. 1 illustrates an overview of a data path selection system 100, according to an example embodiment of the present disclosure. System 100 generally, using data transmission controller 102, determines a selected path 104 for a data load 106 to traverse from a source 108 to a destination 110 through a network 112. System 100 includes data transmission controller 102, which sends test data 114 through network 112, receives response data 116, and receives a request 118 for transmission of data load 106 from source 108 to destination 110.

Example components of data transmission controller are further discussed in connection with FIG. 2, and examples of various paths through network 112 are further discussed in connection with FIG. 3.

Data transmission controller 102 generally determines a selected path 104 to send data load 106 from source 108 to destination 110 through network 112, in certain embodiments. Once a request 118 for the transfer of data load 106 is received by data transmission controller 102, data transmission controller 102 determines selected path 104, in particular embodiments. As an example, once determining selected path 104, data transmission controller 102 may send selected path 104 to source 108, which source 108 then uses to route data load 106 long selected path 104 to destination 110. In certain embodiments, source 108 may be part of or include data transmission controller 102. In some embodiments, destination 110 may be part of or include data transmission controller 102.

In example embodiments, data transmission controller 102 determines selected path 104 by sending out test data 114 through network 112 and receiving response data 116 from network 112 or destination 110. In certain embodiments, test data 114 or response data 116 may pass through source 108 (or destination 110) before entering network 112 (or the rest of network 112 if source 108, destination 110, or data transmission controller 102 are part of network 112).

Data transmission controller 102, in some embodiments, may use information about test data 114 (or test data 114 itself) or response data 116 to determine characteristics describing a number of different paths between various nodes of network 112 (e.g., various paths between source 108 and destination 110), where these characteristics may be known as "path characteristics." These path characteristics may be used to "map" network 112 or determine selected path 104 in particular embodiments or determine a set of path options having various characteristics. In certain embodiments, a request 118 for sending a data load 106 may also include or be used by data transmission controller 102 to create delivery parameters, which in some embodiments are preferences, constraints, or requirements for the delivery of data load 106 (e.g., the level of security required, the time of day of the transfer, a required delivery window, the size of the data load, etc.). Certain embodiments include data transmission controller 102 using path characteristics and delivery parameters to determine selected path 104. Path characteristics and delivery parameters are described in more detail in connection with FIG. 2.

Source 108 generally is a device or entity from which data load 106 will be sent, even if it is sent on behalf of another device or entity (e.g., a third party). Source 108 may be part of network 112, and it may be included as part of, or it may include, data transmission controller 102 in certain embodiments. Source 108 may send request 118 to data transmission controller 102, though in some embodiments another entity or device may send request 118. As an example, source 108 may be a cloud computing entity that seeks (or is requested) to send a large data load to destination 110, a customer of the cloud computing entity (or another data center of the cloud computing entity, etc.). As another example, data transmission controller 102 may be a network service provider that routes data load 106 through network 112 to destination 110 for a client—e.g., source 108 or destination 110.

Destination 110 generally is a device or entity to which data load 106 will be sent. Data load 106 may be sent on behalf of (or based on a request (e.g., 118) from) destination 110, source 108, or any other suitable device or entity (e.g., a third party). Destination 110 may be part of network 112, and it may be included as part of or it may include data transmission controller 102 in certain embodiments. Destination 110 may send request 118 to data transmission controller 102, though in some embodiments another entity or device may send request 118. As an example, destination 110 may be a cloud computing entity that seeks (or is requested) to receive a large data load from source 108, a customer of the cloud computing entity (or another data center of the cloud computing entity, etc.).

Data transmission controller 102, source 108, and destination 110, in certain embodiments, may be servers, computers, terminals, routers, firewalls, gateways, session border controllers, switches, mainframes, laptops, mobile phones, smartphones, tablets, or any other suitable device or any other device capable of receiving, processing, storing, or communicating information with other components of 100, including any combination of the above.

Test data 114 generally is data that is sent through network 112 to obtain information about various paths through network 112, e.g., paths between source 108 and destination 110. In certain embodiments, test data 114 is sent along various paths (made by hopping between different sets of nodes of network 112) within network 112. In some embodiments, test data 114 reaches destination 110 and is returned to data transmission controller 102, and in certain embodiments, test data 114 reaches one or more nodes within network 112 and is returned to source 108 or data transmission controller 102. While test data may be returned in some embodiments, in others different kinds of response data may be generated and returned in addition to, or instead of, test data. Different sets of test data 114 that are sent to or between different nodes of network 112 (and the corresponding response data 116) can be used to construct path characteristics for a path between source 108 and destination 110, even if the full length of the path was not mapped by a single round-trip journey of a set of test data and response data in some embodiments. In still other embodiments, test data is sent to destination 110, reaches destination 110 (or a node along a path toward destination 110) and is not returned to data transmission controller 102. Any suitable test data for mapping paths of network 112 and creating path characteristics of paths within network 112 are contemplated. As one example, test data 114 may be of any suitable size and may be divided into packets of a certain size (e.g., relatively large, standard size, relatively small—compared to common packet sizes used in previous data loads—or a mix). Test data 114 may include a request to send back test data 114 (modified or a portion the test data 114) to source 108 or data transmission controller 102, or a request to send response data 116 to source 108 or data transmission controller 102. In an example embodiment, test data 114 may include timestamp and location information about when and where the test data 114 was sent. Any suitable device or method for sending or receiving test data 114 in order to map paths of network 112 and create path characteristics of paths within network 112 is contemplated.

Test data, in certain embodiments, may not necessarily traverse all nodes of a complete path from source 108 to destination 110, and network 112 may not be the only network or device between source 108 and destination 110. For example, additional networks or other devices, such as firewalls, private devices, etc., could exist between source 108 and destination 110, and in certain instances these other networks and devices may not permit test data or response data to reach destination 110. In particular embodiments, data transmission controller 102 may be focused on only a portion of network 112 or only network 112 but no other (or only some other) devices between source 108 and destination 110, and thus data transmission controller 102 may not send test data to all nodes/devices between source 108 and destination 110.

Response data 116 generally is data that is obtained by data transmission controller 102 from destination 110 or a node of network 112 in response to that destination 110 or node receiving test data 114. In certain embodiments, response data 116 is information about one or more paths (or portions of paths) traversed by test data 114. Response data 116 is used to create path characteristics of the different paths through network 112 In certain embodiments, response data 116 is sent back (ultimately to data transmission controller 102) along the path used by the test data 114 that prompted the response data 116, and in other embodiments response data 116 is sent back (ultimately to data transmission controller 102) along a path different from the path used by the test data 114 that prompted the response data 116. Any suitable device or method for sending or receiving response data 116 in order to map paths of network 112 and create path characteristics of paths within network 112 is contemplated.

In addition, any suitable type of response data for mapping paths of network 112 and creating path characteristics of paths within network 112 is contemplated. For example, response data 116 may include timestamps or other information showing when test data 114 was received by destination 110 or one or more nodes along a particular path, as well as timestamps or other information showing when response data 116 was received by source 108 or data transmission controller 102. As another example, response 116 data may include the size of the response data (total size, packet size, etc.). Response data 116, some embodiments, may include information indicating that a particular node of network 112, or hop between nodes, is (or was) transferring or accepting data at a certain rate, or that a problem was encountered such that a particular node of network 112, or hop between nodes, is (or was) blocked, slow or otherwise not operating properly or at expected performance levels. In particular embodiments, response data 116 may indicate that a certain node of network 112, or hop between nodes, resulted in the test data being intercepted by an unauthorized entity or device, or altered. Response data 116 may also contain, in some embodiments, an identification of some or all of the nodes of network 112 traversed by the corresponding test data 114, as well as timestamps for when the test data arrived at or departed from such nodes.

Request 118 is generally a notification to data transmission controller 102 that a data load is to be delivered from, or on behalf of, source 108 to destination 110 through network 112. Request 118 may be sent by source 108, an entity controlling source 108 and/or data transmission controller 102, destination 110, a third party, or any other suitable entity or device. In certain embodiments, request 118 may request or otherwise cause data transmission controller 102 to send one or more sets of test data 114 through network 112. In an example embodiment, response data 116 from the sending of such test data may be used, alone or in conjunction with other information, to determine a selected path 104 for the data load 106 identified by request 118. In certain embodiments, request 118 may include, or may be analyzed by data transmission controller 102 to determine, delivery parameters of data load 106. As an example, request 118 may contain information about data load 106, requested source 110 from where data load 106 will be sent, and requested destination 110 for data load 106. Delivery parameters, in example embodiments, describe preferences, restrictions, requirements, or other information about the manner in which data load 106 should or must be sent to destination 110. Request 118 may include any suitable information/data in any suitable format.

Data load 106 is generally any type of data or object that is to be sent from source 108 to destination 110 through network 112. Data load 106 can be any suitable type of data, including, e.g., cloud objects may that contain registry information, random access memory (RAM) and RAM resource information, data storage resource information, profile information (e.g., of cloud service users, administrators, etc.), or data of any other suitable type. Data load 106 may be transmitted using any suitable packet size.

Network 112 generally includes a number of different network nodes that may send and receive a data load. The transmission of data from one node to another may be referred to as a "hop" in certain embodiments. Network 112, in some embodiments, may include multiple other networks, be part of a larger network, or be part of a series of different networks. Source 108, destination 110, or data transmission controller 102, in certain embodiments, may be included within network 112. FIG. 3 provides an example embodiment of network 112 that contains a number of nodes.

In certain embodiments, network 112 may be secure or unsecure. In some embodiments, the components of system 100 may each be on the same network, which may be network 112 or any other suitable network. In other embodiments, one or more components of system 100 may be on separate networks, one or none of which is network 112, and may communicate with each other using any suitable means. Network 112 may be any local or wide area network that is suitable for use in or with this disclosure, for example: the Internet, a local area network, a private network, a cellular network, etc.

Network 112, in certain embodiments, facilitates communication between and amongst the various components of system 100, such as between source 108 and destination 110. This disclosure contemplates network 112 being any suitable network operable to facilitate communication between the components system 100. Network 112 may include any interconnecting system capable of transmitting audio, video, signals, data, messages, or any combination of the preceding. Network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Selected path 104 is generally a path, or series of multiple paths, that describe the route data load 106 will take through all or part of the nodes of network 112. For example, selected path 104 may contain a list of nodes or hops that must be (or are preferable) included in the route data load 106 takes through network 112 in a particular instance. Selected path 104 may change for different data loads 106 or for different deliveries of the same or similar data loads 106 in certain embodiments. Selected path 104 may be data in any suitable format. As one example, selected path 104 may be a text file, script, or any other suitable data in any suitable format. In certain embodiments, data transmission controller sends selected path 104 to source 108 before source 108 sends data load 106. In some embodiments, data load 106 may be sent to source 108 and may include selected path 104 as part of data load 106. In particular embodiments, selected path 108 may be generated within or by source 108, particularly if source 108 includes, or is contained within, data transmission controller 102. In some embodiments the entity controlling data transmission controller 102 may be the same or different from the entity controlling source 108.

While certain components of certain devices are shown in FIG. 1 in certain configurations, other suitable components, devices, and configurations are contemplated in this disclosure.

FIG. 2 illustrates a more detailed view of data transmission controller 102 within the context of the data path selection system of FIG. 1, according to an example embodiment of the present disclosure. In general, data transmission controller 102 determines one or more selected paths 104, path characteristics 202, delivery parameters 204, or trends 206. In certain embodiments, data transmission controller 102 determines one or more selected paths 104 based on path characteristics 202, delivery parameters 204, or trends 206. In the example embodiment of FIG. 2, data transmission controller 102 includes a network testing engine 208, a network path characteristics engine 210, a delivery parameters engine 212, a network characteristics database 214, and a path selection engine 216.

Network testing engine 208 generally tests network 112 or certain nodes or jumps within network 112, by sending test data 114 along paths or parts of paths in network 112 in certain embodiments. Additionally, network testing engine 208 generally receives or otherwise determines response data 116 in response to sending test data 114. In certain embodiments, network testing engine 208 may send multiple instances of test data through network 112 or portions thereof, and may receive one or more instances of response data 116. In some embodiments, network testing engine 208 sends test data 114 to destination 110 through network 112 or a portion thereof. Furthermore, request 118 may be received by, or otherwise cause, network testing engine 208 to send one or more instances of test data 114. Test data 114 may be sent prior to receiving request 118, after receiving request 118, based on data transmission controller 102 receiving request 118, or a combination of the above, according to certain embodiments. In some embodiments, request 118 may include test data 114 or may be used by data transmission controller 102 (e.g., network testing engine 208) to determine test data 114 for a particular data load 106, for a set of identified future data loads, or for a set of possible future data loads. Upon receiving or determining response data 116, network testing engine 208 sends the response data 116 to network path characteristics engine 210 (or any other suitable component of data transmission controller 102).

Network path characteristics engine 210 generally determines path characteristics 202 in certain embodiments. For example, network path characteristics engine 210 may receive test data 114 or response data 116 from networking testing engine 208 and base, in whole or in part, path characteristics 202 on test data 114 or response data 116. As another example, response data 116 may be received directly by network path characteristics engine 210, and network path characteristics engine 210 may then determine one or more path characteristics 202 based on response data 116. Path characteristics 202, in some embodiments, describe characteristics of paths through network 112 from source 108 to destination 110, or one or more portions of such paths. In particular embodiments, path characteristics describe certain nodes of network 112 or hops between certain nodes. For example, path characteristics 202 may include (1) when test data 114 was sent (e.g., from data transmission controller 102 or source 108) and/or received by destination 110 or a particular node of network 112, (2) when response data 116 was received (e.g., by destination 110 or a particular node of network 112), (3) the length of time test data (or a past/estimated future data load) takes to make a one way (or round-trip, which could include response data) journey from source 108 to destination 110 along a particular path (or along part of a path) through network 112, (4) the size of the test data 114 or response data 116, e.g., the full size of the load or packet size, (5) the number of hops or the number of nodes traversed by test data 114 along a particular path (or part of a path), (6) an identification of the nodes traversed by test data 114 along a particular path (or part of a path), (7) the number of nodes or hops between nodes traversed by test data 114 along a particular path (or part of a path), (8) nodes that produced error messages, could not accept or send data, were receiving or transmitting data slower or faster compared to previous attempts to send test data 114 to such nodes, etc., and (9) an estimated speed that one or more data loads of various size could be sent along a particular path or portion of a path. In addition, path characteristics 202 may include, in certain embodiments, any other suitable data or other information that describes a path or a portion of a path through network 112, or a journey along a path that test data 114 or response data 116 took through network 112 between source 108 and destination 110. This disclosure contemplates network path characteristics engine 210 determining any suitable path characteristic 202.

Delivery parameters engine 212 generally determines or receives delivery parameters 204, according to certain embodiments. Delivery parameters 204 are restrictions, requirements, requests, preferences, or other necessary, conditional, or recommended limitations on the delivery of a data load 106 in some embodiments. As an example, in some embodiments delivery parameters engine 212 may determine delivery parameters from request 118, which may require processing information within request 118 or recognizing pre-formed delivery parameters included within request 118. As an example, request 118 may include instructions that a data load 106 be sent by a certain time and must be delivered by a certain time (deadline) or within a particular timeframe. In such an instance, delivery parameters engine 212 may use this information in request 118, along with information about the size of data load 106 (provided by request 118 or not) to determine a speed (e.g., an average transfer speed) that a path through network 112 will need to allow for data load 106 to arrive by the time specified in request 118. Thus, in this example, the required timeframe and deadline are delivery parameters 204 provided by request 118, and the speed (e.g., the average transfer speed along the selected path) needed to transfer data load 106 within that timeframe is a delivery parameter 204 calculated by delivery parameters engine 212. Similarly, as another example, in some embodiments delivery parameters engine 212 may determine delivery parameters from user information 205, where user information 205, in some embodiments, is information regarding the past behavior, past or currently requested delivery parameters, or other limitations on the delivery of data load 106 received from or created for a particular user. The user could, in certain embodiments, be an administrator or other user of data transmission controller 102, source 108, destination 110, network 112, or a third party device or entity. In certain embodiments, some or all of delivery parameters 204 may be provided by the user. In some embodiments, delivery parameters may be based on information in a profile for the user, which can contain, e.g., user preferences, past user-included delivery parameters, past delivery parameters determined for requests provided by the user, or any other suitable information about or provided by the user or determined based on the user's activity. In particular embodiments, a combination of request 118 and user information 205 may be used to determine one or more delivery parameters 204. This disclosure contemplates delivery parameters engine 212 determining any suitable delivery parameter 204. Delivery parameters engine 204 may send delivery parameters 204 to any suitable component of data transmission controller 102. For example, delivery parameters engine 212 may send delivery parameters 204 to path selection engine 216 or network characteristics database 214.

As additional examples, delivery parameters 204 may include (1) a time of day of the delivery of data load 106, (2) a timeframe in which the delivery of data load 106 must be completed, (3) one or more nodes that are not to be included in selected path 104 (this deliver parameter may be provided by a third party in certain embodiments), (4) a timeframe in which acknowledgement of the delivery of data load 106 (e.g., by destination 110 or a particular node) must be received, and (5) a maximum number of hops between nodes in selected path 104.

Network characteristics database 214 generally stores response data 116, path characteristics 202, prior response data 220, or prior path characteristics 222, according to certain embodiments. Network characteristics database 214, in some embodiments, creates a repository of historical information related to the transmission of data through a network such as network 112. Such information (e.g., response data and path characteristics) may be used by data transmission controller 102 to determine trends 206 or otherwise predict the behavior or treatment of data loads traversing network 112. In certain embodiments, prior response data 220 is response data similar in nature to response data 116 that was collected in the past, relative to when response data 116 was collected. As an example, response data 116 may include a date and time, e.g., 12:00 pm on a Tuesday, of the arrival of test data 114 at destination 110, and prior response data 220 may include dates and times of the arrival of test data sent a week prior, a month prior, at any time or on any date. In certain embodiments, prior path characteristics 222 are path characteristics similar in nature to path characteristics 202 that were collected in the past, relative to when path characteristics 202 were determined. As an example, path characteristics 202 could include a determined transfer speed along a particular path (path "X") based on test data 114 sent (or response data received) on a Friday at 3:00 pm, and prior path characteristics 222 could include a determined transfer speed (or any other path characteristic) based on test data sent (or response data received) on the previous Wednesday at 10:00 am, a prior Saturday last month at 2:00 am, etc. Network characteristics database may receive, store, and send any suitable type of data used by data transmission controller 102, from or to any suitable component of data transmission controller 102 or any component of system 100.

Network characteristics database 214, in general, is a data/memory storage that stores data in or for system 100, and in particular for data transmission controller 102. In certain embodiments, network characteristics database 214 may not be permanent storage, but rather temporary storage, such as a data cache, though network characteristics database 214 may be any suitable type of storage, including permanent storage, cloud storage, etc. In some embodiments, network characteristics database 214 stores some or all of the data used by system 100 or data transmission controller 102 to operate as described in this disclosure. Network characteristics database 214 may be a separate storage, as shown in the example of FIG. 2, or it may be incorporated into any other component of system 100 or data transmission controller 102 (e.g., within path selection engine 216), or any component outside of system 100 that system 100 can access, e.g., through a network connection.

Path selection engine 216 generally determines selected path 104, according to certain embodiments. For example, in some embodiments, path selection engine determines selected path 104 based on delivery parameters 204, path characteristics 202, or trends 206. Path selection engine 216 may receive delivery parameters from delivery parameters engine 212, path characteristics from network path characteristics engine 210 or network characteristics database 214, and trends from network characteristics database 214, though path selection engine 216 may receive such information from any suitable component of data transmission controller 102, including by determining such information itself. In certain embodiments, path selection engine may determine or modify delivery parameters 204, path characteristics 202, or trends 206, for example, based on information stored by network characteristics database. Path selection engine 216, in particular embodiments, analyzes delivery parameters 204 to determine conditions for transmitting a data load 106 through network 112 that must or preferably should be met. Path selection engine 216 then, for example, compares the delivery parameters 204 (e.g., conditions for transmitting the data load) with one or more path characteristics 202 (or trends 206) to determine one or more paths that are suitable for the transmission of data load 106. In certain embodiments, path selection engine 216 may create a hierarchy of selected paths, which a user or other program can choose from. In some embodiments, path selection engine 216 may create a hierarchy of selected paths (e.g., a top three of potential paths), and then request that networking testing engine 208 send new test data 114 along one or more of the hierarchy of selected paths (or parts thereof) to conform that the data load will be suitably handled based on current information. In such embodiments, the new test data and response data may be used to create updated path characteristics, which path selection engine may use to confirm that one or all of the paths in the selected hierarchy of paths is suitable. Once one or more selected paths 104 are determined, path selection engine 216 sends selected path 104 to source 108 in certain embodiments, which source 108 may use to send data load 106 through network 112 to destination 110. In some embodiments, path selection engine 216, or any other suitable component of data transmission controller 102, may initiate the sending of data load 106, from source 106 or from any other suitable device or location.

Trends 206 generally indicate a probability or likelihood of behavior or treatment of data loads 106 along paths through network 112, either at the present or in the future in some embodiments. In some embodiments, a trend 206 may describe change over time (including a lack of change over time) of one or more path characteristics (e.g., 202, 222) of one or more paths. In certain embodiments, path selection engine 216 may use response data 116, path characteristics 202, prior response data 220, or prior path characteristics 222, either directly or as inputs on which determination of trends 206 is based. Path selection engine 216 determines trends 206, in certain embodiments, based on response data 116, path characteristics 202, prior response data 220, prior path characteristics 222, or other information, such as test data 114. For example, path selection engine may use path characteristics 202 and prior path characteristics 222 to determine that at certain times of day, or on certain days of the week, a particular path through network 112 transmits data loads at higher speeds than at other times and other days of the week. As another example, path selection engine 216 may use response data 116 and prior response data 220 (and path characteristics 202 and prior path characteristics 222) to determine that a certain path, or any path that includes a particular hop between certain nodes, experiences a loss of data, data interception, or instability a certain percentage of the time. Path selection engine 216 may determine in some embodiments that certain data loads 106 having delivery parameters indicating low importance or low priority may be sent along such path(s). Conversely, path selection engine 216 may determine that data loads having delivery parameters indicating a high importance, security level, or priority should not be sent along such path(s). In certain embodiments, path selection engine 216 receives trends 206 from other components of data transmission controller 102 or other components of system 100.

Network testing engine 208, network path characteristics engine 210, delivery parameters engine 212, and path selection engine 216, also referred to as "the engines," have, in certain embodiments, the ability to communicate with other components of data transmission controller 102, system 100, and third party devices, either directly or indirectly, e.g., via a network, e.g., network 112. In some embodiments, the engines receive information from system 100, a third party, or any other suitable source. Such information, in example embodiments, may be from and/or about the information or functionality user or performed by the engines. The engines may use such information, directly or indirectly, to determine a selected path 104. As an additional example, each engine may send information to other engines, other components of system 100, or other systems to effect the desired output (e.g., a selected path, a set of path characteristics, etc.).

In certain embodiments, the engines may contain, use, or share processing resources (e.g., a processor) and memory resources (e.g., a memory). The engines may each have a processor and a memory, or one or more processors or memory may be shared among some or all of the engines. In certain embodiments, processor resources or memory resources are provided via a cloud service. In example embodiments, a processor used by one or more of the engines (which may be more than one processor in one or more components) is any electronic circuitry, including, but not limited to microprocessors, application specific integrated circuits (ASIC), application specific instruction set processor (ASIP), and/or state machines, that communicatively couples to a memory and controls the operation of data transmission controller 102, or components thereof. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory to perform any of the functions described herein. The processor controls the operation and administration of data transmission controller 102, or components thereof, by processing information received from, e.g., a user, source 108, destination 110, network 112, a third party, or any component of system 100. The processor may be a programmable logic device, a microcontroller, a microprocessor, any suitable processing device, or any suitable combination of the preceding. The processor is not limited to a single processing device and may encompass multiple processing devices.

In example embodiments, a memory used by one or more of the engines (which may be more than one memory in one or more components and may, in some embodiments, include network characteristics database 214 or portions thereof) may store, either permanently or temporarily, data, operational software, or other information for one or more processors used by one or more of the engines ("the processor"). The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

Components of data transmission controller 102 may be contained within a single physical system or distributed in different systems connected via private or public networks, in certain embodiments. In some embodiments, the components of system 100 (and the components of data transmission controller 102) may each be on the same network, which may be network 112, or any other suitable network. In other embodiments, one or more components of system 100 (and the components of data transmission controller 102) may be on separate networks, one or none of which is network 112, and may communicate with each other using any suitable means. Such network(s) may be any local or wide area network that is suitable for use in or with this disclosure, for example: the Internet, a local area network, a private network, a cellular network, etc.

While certain components of certain devices are shown in FIG. 2 in certain configurations, other suitable components, devices, and configurations are contemplated in this disclosure.

FIG. 3 illustrates example paths through network 112 between source 108 and destination 110 of FIGS. 1 and 2, according to an example embodiment of the present disclosure. Network 112 generally contains a number of nodes 302-316 (labeled "A" through "H"). Paths 318-324 generally consist of hops between certain of nodes 302-316. In certain embodiments, paths 318-324 (or portions of such paths) are mapped by data transmission controller 102 of FIGS. 1 and 2 sending test data long paths 318-324 or to nodes 302-316 and then generating path characteristics and, ultimately, a selected path through network 112.

Nodes 302-316 are any suitable network nodes. For example, nodes 302-316 may be servers, computers, terminals, routers, firewalls, gateways, session border controllers, switches, mainframes, laptops, mobile phones, smartphones, any other suitable device that sends and receives data as part of a network, or any combination of the foregoing. In certain embodiments, source 108 or destination 110 are part of network 112. Nodes 302-316, in some embodiments, send response data (or test data) back to data transmission controller 102 of FIGS. 1 and 2 after receiving test data, whether at the request of the sent test data or on the node's own accord. Certain nodes may operate over time with variability, such that they send data relatively quickly at some times, relatively slowly at other times, or not at all on occasion. Some nodes may represent a security risk, e.g., because third parties can view or intercept data passing through such nodes. Nodes 302-316 may be part of the same network or operated by the same entity, or nodes 302-316 may be part of different networks or operated by different entities.

Paths 318-324 represent example paths through network 112 that a data load may take to arrive at destination 110 after being sent from source 108. Nodes 302-316 (labeled "A" through "H"), and the hops between these nodes, characterize particular paths, for example, paths 318-324. Path 318 runs from source 108 to node A to node B to destination 110, which can be characterized in this disclosure as "AB," where the source and destination are understood to be at the beginning and end of each path, respectively. Path 320 is ABC (runs through nodes A, B, and C). Path 322 is DC. Path 324 is EFGH. Any suitable path can be traversed among the nodes of network 112 to transfer data from source 108 to destination 110. In certain embodiments, paths may traverse part of network 112 such that a path does not run continuously from source 108 through destination 110 but rather a portion of a full path. In such instances, data loads may still be transferred to a destination 110, but only a portion of the complete path to destination 110 is mapped or part of selected path 104.

In certain embodiments, a particular path may be suitable over another, under certain conditions, and data transmission controller 102 may determine a selected path based on test data, response data, path characteristics (current and prior), data delivery parameters, and other information as described, for example, in regard to FIG. 2. For example, path AB (318) may deliver data faster than path ABC in certain instances, however at a certain time of day data from node B to destination 110 may be unstable or cause too many dropped packets, whereas data from node B to node C and node C to destination 110 is delivered without these issues. Thus, in certain situations, path ABC (320) may be the quickest or most reliable path to use. As another example, node B may be flagged as a security risk (e.g., as part of a delivery parameter or a path characteristic) and sensitive data loads may instead be routed via path DC (322), thereby bypassing node B. As yet another example, data traversing nodes A, B, and C, may be slowed during a certain time of day (e.g., 4:00 pm to 5:00 pm on weekdays), causing paths AB (318), ABC (320), and DC (322) to be unacceptably slow. In such instances, path EFGH (324), which may be relatively slower on other occasions, may be the fastest during the certain time of day that nodes A, B, and C, are slow. Thus, selecting path EFGH (324) may be preferable in such instances. Nodes A-H (302-316) and paths 318-324 are merely example nodes and paths that network 112 may contain, and any suitable number and type of nodes and paths are contemplated.

FIG. 4 illustrates a method 400 for dynamically determining a selected path through a network for delivering a data load, according to an example embodiment of the present disclosure. In certain embodiments, some or all of the components of FIGS. 1 and 2 may be used to perform some or all of the steps of method 400. In some embodiments, method 400 may be used to select an appropriate path through a network (e.g., selected path 104), such as the various example paths depicted in FIG. 3. Method 400 contains step 402 through step 424.

Step 402 includes sending test data along multiple different paths of a network between a source and a destination. For example, test data 114 may be sent through some or all of a path through network 112 toward destination 110, in certain embodiments. In some embodiments, data transmission controller 102 sends such test data.

Step 404 includes receiving, in response to sending the test data, response data containing information about the different paths. For example, response data 116 may be received by data transmission controller 102.

Step 406 includes determining characteristics of each of the different paths (path characteristics) based on the response data. For example, path characteristics 202 may be determined by network path characterization engine 210 based on response data 116 and/or test data 114.

Step 408 includes determining whether to store the response data and/or the path characteristics. If the answer is yes, meaning any of such information is to be stored, method 400 proceeds to step 410. If the answer is no, method 400 proceeds to step 420.

Step 410 includes storing the response data and the characteristics of each of the different paths (path characteristics). In addition, step 410 may involve, in certain embodiments, storing, obtaining, or recalling previously stored, prior response data and prior path characteristics (e.g., prior response data 220 and prior path characteristics 222).

Step 412 includes determining whether a trend (e.g., one or more trends 206) is to be determined. If a trend is to be determined, method 400 proceeds to step 414. If a trend is not to be determined, method 400 returns to step 410.

Step 414 includes determining one or more trends (e.g., trends 206). Trends may, in some embodiments, be determined based on the test data, the response data, the path characteristics, the prior response data, or the prior characteristics. In certain embodiments, path selection engine 216 determines trends (e.g., trends 206). In some embodiments, network characteristics database 214 determines trends 206. As one example, if path selection engine 216 (or network characteristics database 214) detects a trend 206 indicating that a particular hop is under stress/heavy load at certain times, knowledge of that trend 206 can be used to preemptively re-route away from that particular hop during the times of stress/heavy load.

Step 416 includes receiving a request for delivery of a data load to a destination (e.g., destination 110). The request, in certain embodiments, may contain information about the data load, a source from which the data load is to be sent, or a destination to which the data load is to be sent. An example of such a request is request 118 from FIGS. 1 and 2. In certain embodiments, the request may be sent by a user, and the user may include particular delivery parameters (e.g., delivery parameters 204), or information from which delivery parameters can be determined, e.g., by data transmission controller 102. In some embodiments, the request may trigger (as an explicit part of the request itself or as determined by a system such as data transmission controller 102) the sending of test data (e.g., step 402) along one or more paths through a network (e.g., network 112). Delivery parameters engine 212 and/or network testing engine 208 may receive the request (e.g., request 118).

Step 418 includes determining, based on the request and/or user information, one or more delivery parameters. In certain embodiments, delivery parameters may be included with the request and/or provided by the user. In some embodiments, delivery parameters may be based off information in a profile for the user, which can contain, e.g., user preferences, past user-included delivery parameters, past delivery parameters determined for requests provided by the user, or any other suitable information about or provided by the user or determined based on the user's activity. In certain embodiments, delivery parameters engine 212 determines the delivery parameters.

Step 420 includes determining a selected path from the multiple different paths of step 402, based on the delivery parameters determined at step 418, the path characteristics determined at step 406, some or all of the information stored, obtained, or recalled at step 410, and/or trends determined at step 414. As one example, a selected path, or a hierarchy or group of selected paths, are determined based on the delivery parameters and the path characteristics of each of the different paths, such that the path characteristics indicate that the selected paths(s) satisfy some or all of the delivery parameters. Examples of path characteristics that may be analyzed include information indicating that a particular node (or hop) is (or was) transferring or accepting data at a certain rate, or that a problem was encountered such that a particular node (or hop) is (or was) blocked, slow, or otherwise not operating properly or at expected performance levels. In particular embodiments, path characteristics can indicate if a node (or hop) has been compromised, for example, based on checking a registration of nodes/hops that are known to be compromised or based on determining that the test data has failed or looks compromised (e.g., if the test data looks like it has been intercepted by an unauthorized entity or device, or altered). Path selection engine 420 can use this information to pre-emptively re-route away from compromised nodes and hops. In certain embodiments, path selection engine 420 determines selected paths, such as selected path 104.

Step 422 includes sending the selected path to a source, for example source 108. If the source is part of the device determining the selected path, then in certain embodiments a selected path need not be sent and the data load can sent along the selected path.

Step 424 includes sending the data load along the selected path. For example, this step may include sending the data load from the source, e.g., source 108, to the destination included in the request, e.g., destination 110.

Although this disclosure describes and illustrates particular steps of the method 400 of FIG. 4 as occurring in a particular order, this disclosure contemplates any steps of the method of FIG. 4 occurring in any order. An embodiment can repeat or omit one or more steps of the method of FIG. 4. Moreover, although this disclosure describes and illustrates particular components carrying out particular steps of the method of FIG. 4, this disclosure contemplates any combination of any components carrying out any steps of the method of FIG. 4.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or."

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A system, comprising:
  a network testing processor configured to:
    send test data along a plurality of different paths of a network between a source and a destination, wherein each of the plurality of different paths comprises a plurality of nodes of the network; and
    receive, in response to sending the test data, response data comprising information about the plurality of different paths;
  a network path characteristics processor configured to determine a plurality of characteristics of each of the plurality of different paths based on the response data;
  a delivery parameters processor configured to:
    receive a request for delivery of a data load, the request comprising information about the data load, a data load source, and a data load destination, wherein the data load source is the same as the source, and the data load destination is the same as the destination; and
    determine, based on the request, one or more delivery parameters that describe at least one of requirements or preferences for the delivery of the data load; a path selection processor configured to:
    determine a trend, the tread describing change over time of one or more characteristics of at least some of the plurality of different paths, based on:
      at least one of the response data and the plurality of characteristics of each of the plurality of different paths; and
      at least one of prior response data and a plurality of prior characteristics of each of the plurality of different paths;
    determine a selected path, wherein the selected path is one of the plurality of different paths, based on:
      the determined trend;
      the plurality of characteristics of each of the plurality of different paths; and
      the one or more delivery parameters; and
    send the selected data path to the data load source; and
  the data load source configured to send the data load along the selected path to the data load destination.

2. The system of claim 1, further comprising a network characteristics database configured to store:

at least one of the response data and the plurality of characteristics of each of the plurality of different paths;

the prior response data created based on at least one prior event wherein prior test data was sent along the plurality of different paths of the network; and the plurality of prior characteristics of each of the plurality of different paths created based on the at least one prior event; and wherein the path selection processor is further configured to determine the selected path based on at least one of the prior response data and the plurality of prior characteristics of each of the plurality of different paths.

3. The system of claim 1, wherein the network testing processor is further configured to send the test data in response to receiving the request for the delivery of the data load.

4. The system of claim 1, wherein:

the request is sent by a user; and wherein the delivery parameters processor is further configured to:

determine user information comprising information about one or more prior data load deliveries requested by the user; and determine the delivery parameters based on the user information.

5. The system of claim 1, wherein the plurality of characteristics of each of the plurality of different paths comprises at least one of:

when the test data was sent;

when the test data was received by the destination;

when the response data was received;

a size of the test data;

a number of hops and a number of nodes traversed by the test data; and an identification of the nodes traversed by the test data.

6. The system of claim 1, herein the one or more delivery parameters comprise at least one of:

a time of day of the delivery of the data load;

a timeframe in which the delivery of the data load must be completed;

one or more nodes that are not to be included in the selected path;

a timeframe in which acknowledgement of the delivery of the data load must be received; and a maximum number of hops between nodes in the selected path.

7. A system, comprising:

a network testing processor configured to:

send test data along a plurality of different paths of a network between a source and a destination, wherein each of the plurality of different paths comprises a plurality of nodes of the network; and receive, in response to sending the test data, response data comprising information about the plurality of different paths;

a network path characteristics processor configured to determine a plurality of characteristics of each of the plurality of different paths based on the response data;

a delivery parameters processor configured to:

receive a request for delivery of a data load, the request comprising information about the data load, a data load source, and a data load destination, wherein the data load source is the same as the source, and the data load destination is the same as the destination; and determine, based on the request, one or more delivery parameters that describe at least one of requirements or preferences for the delivery of the data load; and a path selection processor configured to:

determine a trend, the trend describing change over time of one or more characteristics of at least some of the plurality of different paths, based on:

at least one of the response data and the plurality of characteristics of each of the plurality of different paths; and at least one of prior response data and a plurality of prior characteristics of each of the plurality of different paths;

determine a selected path, wherein the selected path is one of the plurality of different paths, based on:

the determined tread;

the plurality of characteristics of each of the plurality of different paths; and the one or more delivery parameters; and send the selected data path to the data load source.

8. The system of claim 7, further comprising a network characteristics database configured to store:

at least one of the response data and the plurality of characteristics of each of the plurality of different paths;

the prior response data created based on at least one prior event wherein prior test data was sent along the plurality of different paths of the network; and the plurality of prior characteristics of each of the plurality of different paths created based on the at least one prior event; and wherein the path selection processor is further configured to determine the selected path based on at least one of the prior response data and the plurality of prior characteristics of each of the plurality of different paths.

9. The system of claim 7, wherein the network testing processor is further configured to send the test data in response to receiving the request for the delivery of the data load.

10. The system of claim 7, wherein:

the request is sent by a user; and wherein the delivery parameters processor is further configured to:

determine user information comprising information about one or more prior data load deliveries requested by the user; and determine the delivery parameters based on the user information.

11. The system of claim 7, wherein the one or more delivery parameters comprise at least one of:

a time of day of the delivery of the data load;

a timeframe in which the delivery of the data load must be completed;

one or more nodes that are not to be included in the selected path;

a timeframe in which acknowledgement of the delivery of the data load must be received; and a maximum number of hops between nodes in the selected path.

12. A method, comprising:

sending test data along a plurality of different paths of a network between a source and a destination, wherein each of the plurality of different paths comprises a plurality of nodes of the network;

receiving, in response to sending the test data, response data comprising information about the plurality of different paths;

determining a plurality of characteristics of each of the plurality of different paths based on the response data;

receiving a request for delivery of a data load, the request comprising information about the data load, a data load source, and a data load destination, wherein the data load source is the same as the source, and the data load destination is the same as the destination;

determining, based on the request, one or more delivery parameters that describe at least one of requirements or preferences for the delivery of the data load;

determining a trend, the trend describing change over time of one or more characteristics of at least some of the plurality of different paths, based on:
- at least one of the response data and the plurality of characteristics of each of the plurality of different paths; and
- at least one of prior response data and a plurality of prior characteristics of each of the plurality of different paths;

determining a selected path, wherein the selected path is one of the plurality of different paths, based on:
- the determined tread;
- the plurality of characteristics of each of the plurality of different paths; and
- the one or more delivery parameters; and sending the data load along the selected path to the data load destination.

13. The method of claim 12, further comprising:

storing, in a network characteristics database, at least one of the response data and the plurality of characteristics of each of the plurality of different paths, the network characteristics database comprising the prior response data and the plurality of prior characteristics of each of the plurality of different paths created based on at least one prior event wherein prior test data was sent along the plurality of different paths of the network; and determining the selected path based on at least one of the prior response data and the plurality of prior characteristics of each of the plurality of different paths.

14. The method of claim 12, wherein sending the test data occurs in response to receiving the request for the delivery of the data load.

15. The method of claim 12, wherein the request is sent by a user, the method further comprising:

determining user information comprising information about one or more prior data load deliveries requested by the user; and determining the delivery parameters based on the user information.

16. The method of claim 12, wherein the plurality of characteristics of each of the plurality of different paths comprises at least one of:

when the test data was sent;

when the test data was received by the destination;

when the response data was received;

a size of the test data;

a number of hops and a number of nodes traversed by the test data; and an identification of the nodes traversed by the test data.

17. The method of claim 12, wherein the one or more delivery parameters comprise at least one of:

a time of day of the delivery of the data load;

a timeframe in which the delivery of the data load must be completed;

one or more nodes that are not to be included in the selected path;

a timeframe in which acknowledgement of the delivery of the data load must be received; and a maximum number of hops between nodes in the selected path.

18. The system of claim 1, wherein two or more of the network testing processor, the network path characteristics processor, the delivery parameters processor, and the path selection processor are implemented as one or more shared processors.

19. The system of claim 7, wherein two or more of the network testing processor, the network path characteristics processor, the delivery parameters processor, and the path selection processor are implemented as one or more shared processors.

* * * * *